United States Patent
Kanazawa et al.

(10) Patent No.: US 12,162,718 B2
(45) Date of Patent: Dec. 10, 2024

(54) HAND SYSTEM AND HAND

(71) Applicant: FANUC CORPORATION, Yamanashi (JP)

(72) Inventors: Youhei Kanazawa, Yamanashi-ken (JP); Naoki Akagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 64 days.

(21) Appl. No.: 17/910,473

(22) PCT Filed: Apr. 2, 2021

(86) PCT No.: PCT/JP2021/014393
§ 371 (c)(1),
(2) Date: Sep. 9, 2022

(87) PCT Pub. No.: WO2021/206028
PCT Pub. Date: Oct. 14, 2021

(65) Prior Publication Data
US 2023/0140740 A1    May 4, 2023

(30) Foreign Application Priority Data

Apr. 7, 2020   (JP) .................... 2020-069322

(51) Int. Cl.
*B65H 7/12*   (2006.01)
*B25J 15/06*  (2006.01)
*B65H 3/14*   (2006.01)

(52) U.S. Cl.
CPC ............ *B65H 7/12* (2013.01); *B25J 15/0616* (2013.01); *B65H 3/14* (2013.01)

(58) Field of Classification Search
CPC ........... B65H 7/12; B65H 3/14; B25J 15/0616
See application file for complete search history.

(56) References Cited

U.S. PATENT DOCUMENTS 3,826,487 A * 7/1974 Forster .................. G01B 21/08
                                                    33/DIG. 13
4,185,814 A * 1/1980 Buchmann .......... H01L 21/6838
                                                    271/259

(Continued)

FOREIGN PATENT DOCUMENTS

JP       02078284 U    6/1990
JP       11067647 A    3/1999

(Continued)

OTHER PUBLICATIONS

Printout of webpage by Bride Technology: "Sheet Resistance and the Calculation of Resistivity or Thickness Relative to Semiconductor Applications", available as of Mar. 22, 2019 @ https://web.archive.org/web/20190322154523/https://four-point-probes.com/sheet-resistance-and-the-calculation-of-resistivi.*

(Continued)

*Primary Examiner* — Gregory W Adams
(74) *Attorney, Agent, or Firm* — Fredrikson & Byron, P.A.

(57) ABSTRACT

This hand system comprises: a suction pad that sucks a conductive workpiece by fluid effect; at least three electrodes that are arranged on the suction pad; and an electrical characteristics measuring device that measures the electrical characteristics of an electrical circuit formed by the contact between any two of the electrodes and the workpiece.

7 Claims, 10 Drawing Sheets

(56) References Cited

U.S. PATENT DOCUMENTS

| | | | | |
|---|---|---|---|---|
| 4,509,891 | A * | 4/1985 | Lipscomb | B65H 19/123 198/750.12 |
| 4,883,300 | A * | 11/1989 | Akagawa | H05K 13/0408 269/254 R |
| 6,388,452 | B1 * | 5/2002 | Picciotto | B41J 11/0035 324/452 |
| 6,417,677 | B1 * | 7/2002 | Yamazaki | G03F 1/20 324/715 |
| 8,534,730 | B2 * | 9/2013 | Strohmayr | B66C 1/0293 901/33 |
| 8,564,926 | B2 * | 10/2013 | Prahlad | B25J 15/0085 361/234 |
| 10,054,418 | B2 * | 8/2018 | Bernard | B65H 7/12 |
| 2009/0256581 | A1 * | 10/2009 | Lu | H02S 50/10 198/339.1 |
| 2015/0124369 | A1 * | 5/2015 | Thiel | H01L 21/6833 361/234 |
| 2016/0029437 | A1 * | 1/2016 | Grohmann | B25J 15/06 219/486 |

FOREIGN PATENT DOCUMENTS

| | | | | |
|---|---|---|---|---|
| JP | 2000103545 | A | | 4/2000 |
| JP | 2003054774 | A | | 2/2003 |
| JP | 2010254438 | A | | 11/2010 |
| KR | 20180003900 | A | * | 1/2018 ......... H01M 8/0297 |
| WO | 2018105121 | A1 | | 6/2018 |

OTHER PUBLICATIONS

English Abstract and Machine Translation for International Publication No. WO 2018-105121 A1, published Jun. 14, 2018, 13 pgs.

English Abstract and Machine Translation for Japanese Publication No. 2010-254438 A, published Nov. 11, 2010, 19 pgs.

English Abstract and Machine Translation for Japanese Publication No. 2003-054774 A, published Feb. 26, 2003, 21 pgs.

English Abstract and Machine Translation for Japanese Publication No. 2000-103545 A, published Apr. 11, 2000, 21 pgs.

English Abstract and Machine Translation for Japanese Publication No. 11-067647 A, published Mar. 9, 1999, 20 pgs.

English Machine Translation for Japanese Publication No. 02-078284, published Jun. 15, 1990, 3 pgs.

PCT International Search Report dated May 11, 2021 for International Application No. PCT/JP2021/014393, from which the instant application is based, 3 pgs.

* cited by examiner

HAND SYSTEM AND HAND

RELATED APPLICATIONS

This application is a 35 U.S.C. 371 national phase filing from International Application No. PCT/JP2021/014393, filed Apr. 2, 2021, which claims priority to Japanese Application No. 2020-069322, filed Apr. 7, 2020, the contents of which are incorporated herein by reference.

FIELD

The present invention relates to a hand technology, and in particular, relates to a hand system and hand which can execute workpiece extraction detection with few restrictions.

BACKGROUND

As pick-and-place hands, various hands such as a multi-finger grip type, electromagnetic suction type, vacuum suction type, and Bernoulli type hands are known. When using these hands to extract sheet-like air-permeable workpieces such as meshes, it may not be possible to extract a workpiece with a multi-finger grip type hand due to a lack of wall thickness. In electromagnetic suction type hands, the workpiece is limited to magnetic materials. In vacuum suction type hands, air can leak through the workpiece, whereby vacuum pressure cannot be maintained and the workpiece cannot be suctioned. Thus, in the case of such sheet-shaped air-permeable workpieces, it is common to use a Bernoulli-type hand that suctions workpieces by negative pressure generated by the ejection of compressed air. As technologies related to these hands, the following literature is known.

Patent Literature 1 describes an air-permeable workpiece removal/retention device which can extract stacked air-permeable workpieces one by one and securely retain an air-permeable workpiece by vacuum suction by suctioning the air-permeable workpieces in a non-contact manner using the suction force generated by the ejection of compressed air from a compressed air ejection nozzle and vacuum suctioning and holding the extracted air-permeable workpieces with a vacuum suction nozzle.

Patent Literature 2 describes a separating device which lifts and separates stacked sheet-shaped magnetic materials by electromagnetic attraction, wherein there is provided an eddy current-type thickness detection mechanism in which an excitation coil which generates a high-frequency magnetic field is arranged near one end surface of the sheet-shaped magnetic material and a detection coil which detects the impedance of the sheet-like magnetic materials is arranged near the other end face of the sheet-like magnetic material.

Patent Literature 3 describes a photomask antistatic method, wherein in order to monitor and detect with an electrical resistance measurement device that a conductive film has been reached by driving two conductive pins into the photomask, resistance detection pins connected to the electrical resistance measurement device are arranged side by side on a suction pad, and when the conductive pins come into contact with the suction pad, the resistance detection pins make electrical contact with the conductive pins.

CITATION LIST

Patent Literature

[PTL 1] Japanese Unexamined Patent Publication (Kokai) No. 2003-54774

[PTL 2] Japanese Unexamined Patent Publication (Kokai) No. 2010-254438

[PTL 3] Japanese Unexamined Patent Publication (Kokai) No. 11-67647

SUMMARY

Technical Problem

When extracting a workpiece with a hand, in some cases, the workpiece cannot be extracted, and in some cases, when attempting to extract a single workpiece, a plurality of workpieces are extracted or the gripping state thereof is not suitable. Though an electromagnetic induction type sensor, an image recognition sensor, or the like can be used for detecting the extraction of workpieces (detection of the number of workpieces extracted, detection of the gripping state, etc.), there are problems as described below, and they may not be applicable.

Though electromagnetic induction-type contact sensors generate a magnetic field to magnetize a workpiece and measure the amount of magnetic flux of the magnetic field generated in the workpiece to detect the extraction of the workpiece, the workpiece is limited to magnetic materials. Furthermore, though such sensors are suitable for workpieces having a flat surface with good adhesion to the sensor, measurement cannot be accurately performed on workpieces having poor adhesion such as wrinkles or unevenness. Furthermore, in two-head type electromagnetic induction non-contact sensors, a workpiece is inserted between north and south pole magnets, an eddy current is generated in the workpiece, and the amount of magnetic flux of the magnetic field generated by the eddy current is measured, but the workpiece is limited to sheet-shaped flat plate workpieces.

Conversely, in image recognition sensors such as cameras, it is necessary to switch parameters for image recognition and error determination in accordance with the shape of the workpiece and the surrounding environment, which is complicated. Furthermore, in the case of sheet-shaped workpieces, if the workpieces are in close contact with each other in a state where the outer shapes are aligned, it may not be possible to determine whether one workpiece or a plurality of workpieces have been extracted. Further, in image recognition sensors, the entire system becomes expensive, whereby the hand system becomes expensive.

Thus, there is a need for a hand technology which can execute workpiece extraction detection with few restrictions.

Solution to Problem

An aspect of the present disclosure provides a hand system, comprising a suction pad configured to suction a conductive workpiece by the fluid effect, at least three electrodes arranged on the suction pad, and an electric characteristic measurement instrument configured to measure the electrical characteristics of an electric circuit formed by contact between any two of the electrodes and the workpiece.

Another aspect of the present disclosure provides a hand, comprising a suction pad configured to suction a conductive workpiece by the fluid effect, and an electrode which protrudes from a suction surface of the suction pad and which is capable of ascending in response to contact with the workpiece.

Yet another aspect of the present disclosure provides a hand, comprising a suction pad configured to suction a conductive workpiece by the fluid effect, at least three electrodes arranged on the suction pad, and a rotary contact with is capable of switching contact with any two of the electrodes.

Advantageous Effects of Invention

According to the aspect of the present disclosure, by providing the hand with at least three electrodes, the gripping state of the workpiece can be detected. Furthermore, by measuring the electrical characteristics of an electric circuit formed by contact between any two of the electrodes and the workpiece, the number of extracted workpieces can be detected. Since the extraction of the workpiece is detected by measuring the electrical characteristics, the workpiece is not limited to magnetic materials and it is sufficient that it be a conductor. Furthermore, the extraction of workpieces can be detected even if the workpieces are in close contact with each other in a state where the outer shapes thereof match. Thus, the workpiece extraction detection (detection of the number of extractions, detection of the gripping state, etc.) can be executed with few restrictions.

According to the other aspect of the present disclosure, since the electrode protrudes from the suction pad, workpiece extraction detection can be executed even with a Bernoulli-type hand which retains a workpiece in a non-contact manner. Furthermore, even if the workpiece has poor adhesiveness, such as if it has wrinkles or unevenness, since the electrode can ascend, depending on the shape of the workpiece, workpiece extraction detection can be executed with few restrictions.

According to the yet other aspect of the present disclosure, since the rotary contact can switch contact to any two of the electrodes, even if the number of electrodes increases, the electrical characteristic value between any electrodes can be measured with only one electric characteristic measurement instrument. As a result, workpiece extraction detection can be executed with few restrictions.

DESCRIPTION OF EMBODIMENTS

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms.

Figure 1:
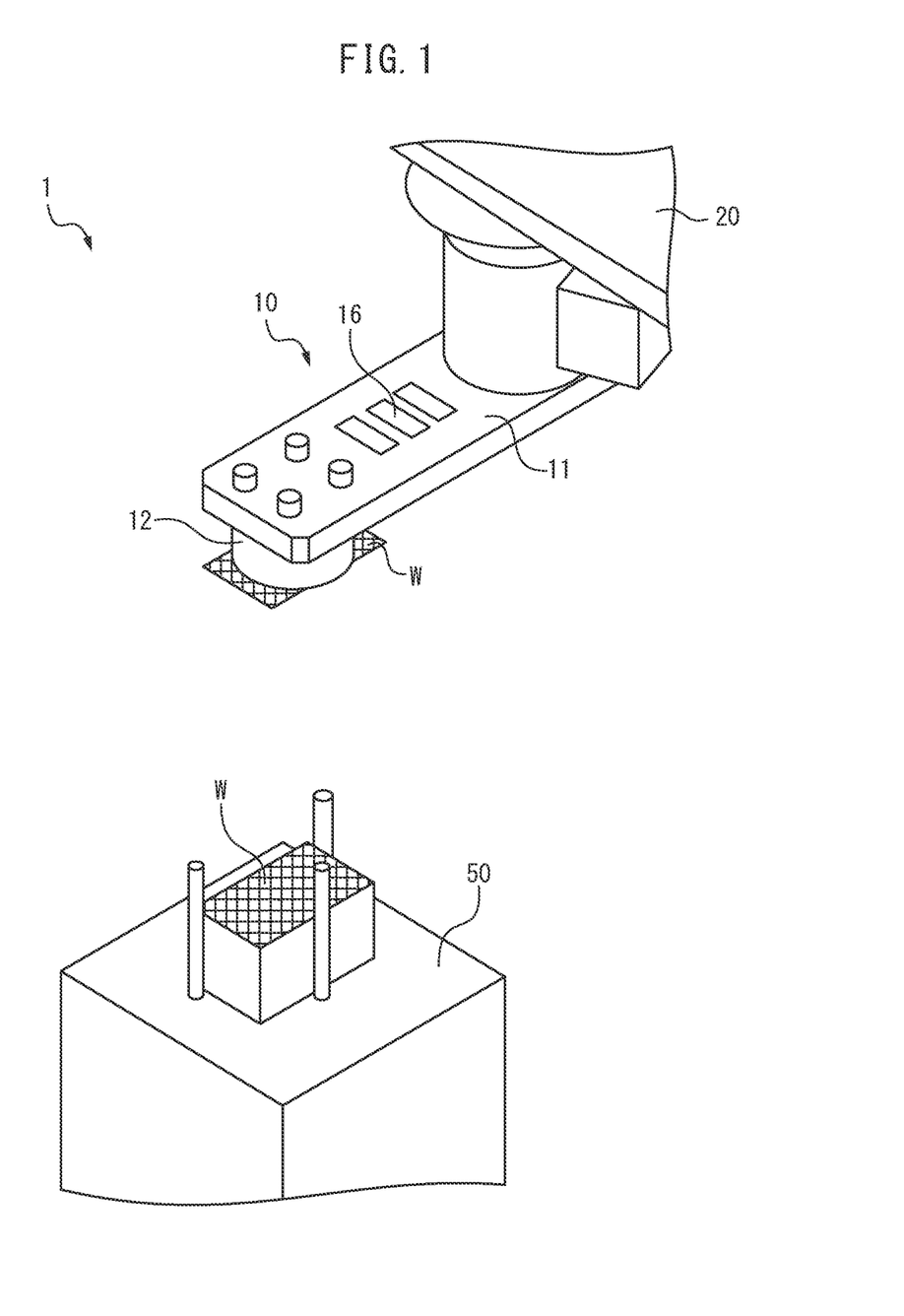
FIG. 1 is a perspective view showing a hand system and hand according to an embodiment.

FIG. 1 shows a hand system 1 according to the present embodiment. The hand system 1 comprises a hand 10 which extracts workpieces W, and a transport device 20 which transports extracted workpieces W to predetermined locations. As long as the workpieces W are conductive workpieces, they may be, for example, air-permeable workpieces such as metal meshes, or air-impermeable workpieces such as conductive films for touch panels. Though the workpiece W is a sheet-shaped workpiece having no wall thickness, it may have a thick wall as long as it is relatively lightweight. Though the workpieces W are stacked on a mounting device 50, they need not necessarily be stacked. The mounting device 50 may be a fixedly installed workpiece stocker, or may be a movable mounting device such as a conveyor, a shuttle, or an automatic guided vehicle. The hand 10 is a Bernoulli-type hand that suctions workpieces W by the Bernoulli effect, or may be a vacuum suction type hand. The hand 10 comprises a palm 11 attached to the end of the transport device 20 and a suction pad 12 affixed to the palm 11 for suctioning workpieces W by the fluid effect. The hand 10 further comprises at least three electrodes 13 arranged on the suction pad 12 (refer to FIGS. 2A and 2B), and an electric characteristic measurement instrument 16 which measures the electrical characteristics of an electric circuit formed by contact between any two of the electrodes 13 and a workpiece W. The transport device 20 is an industrial robot such as an articulated robot or a parallel link type robot, or may be a transport device such as a loader, a shuttle, or an automatic guided vehicle.

Figure 2A:
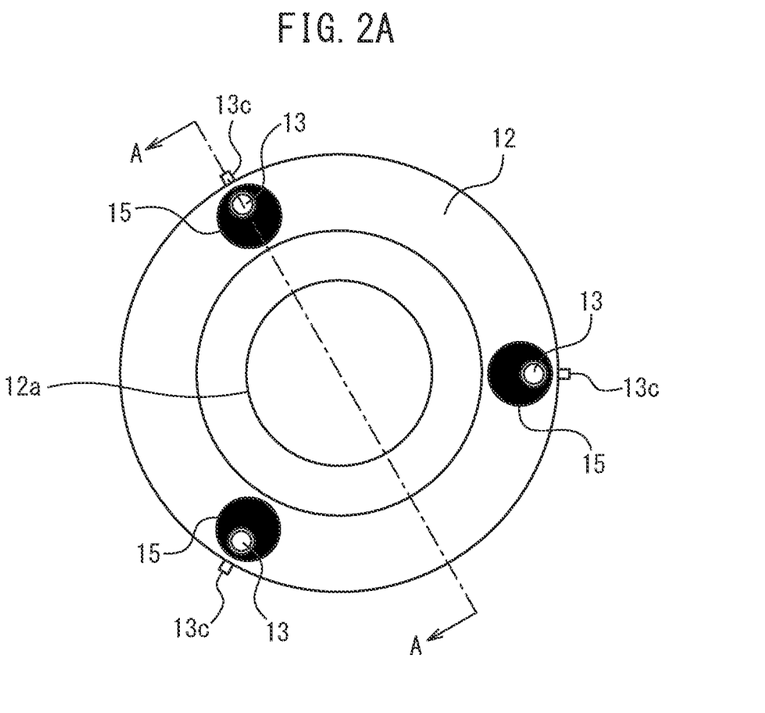
FIG. 2A is a bottom view showing a bottom surface of a suction pad according to an embodiment.
Figure 2B:
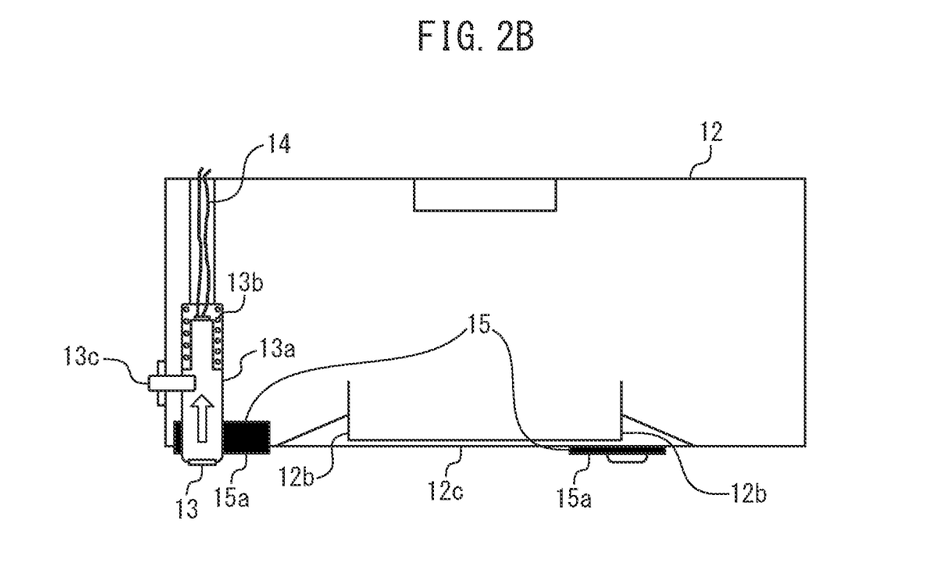
FIG. 2B is a partial cross-sectional view showing a cross-section of the suction pad according to an embodiment taken along line A-A.

FIG. 2A shows the bottom surface of the suction pad 12, and FIG. 2B shows the cross-section of the suction pad 12 of FIG. 2A taken along line A-A. In the case of a Bernoulli-type hand, the suction pad 12 may be a non-contact pad comprising a nozzle 12a which ejects a fluid such as compressed air, and in the case of vacuum suction-type hand, a suction pad which comprises a nozzle which generates vacuum pressure between the workpiece and the suction pad 12 may be used. In the case of Bernoulli-type hands, by arranging a plurality of nozzle holes 12b at equal intervals on the peripheral side surface of the nozzle 12a, a fluid such as compressed air is ejected from the nozzle hole 12b in the outer peripheral direction to generate a negative pressure region having a pressure lower than atmospheric pressure directly under the nozzle 12a, whereby the suction pad 12 suctions workpieces in a non-contact manner.

The electrodes 13 are connected to the electric characteristic measurement instrument 16 (refer to FIG. 1) via respective electrical lines 14. The electric characteristic measurement instrument 16 measures the electrical characteristics of an electric circuit formed by contact between any two electrodes 13 and a workpiece. The electrical characteristics may be, for example, electrical resistance, but may also be electrical conductivity, current, or the like. By measuring the electrical characteristics, it becomes possible to detect the number of workpieces extracted. For example, when one metal mesh workpiece is extracted as shown in FIG. 1, the electric resistance becomes approximately 0.8Ω, and when two are extracted together, the electric resistance becomes approximately 0.4Ω, and when three are extracted, the electrical resistance becomes approximately 0.3Ω. Specifically, as the number of meshes increases, the electric resistance decreases (or the electric conductivity or the current increases), whereby the number of workpieces extracted can be detected.

It is preferable that the electrodes 13 be arranged at equal intervals in the circumferential direction of the suction pad 12, and in particular, the outer peripheral direction of the nozzle 12a. By providing at least three electrodes 13, the quality of the gripping state of the workpiece can be detected. For example, when a workpiece can be detected with any combination of the electrodes 13, it can be determined that the gripping state of the workpiece is suitable; when a workpiece can be detected with some combinations of the electrodes 13, it can be determined that the gripping state of the workpiece is not suitable; and when a workpiece cannot be detected by any combination of the electrodes 13, it can be determined that a workpiece has not been extracted. Since the extraction of workpieces can be detected (detection of the number of extracted workpieces, detection of the gripping state, etc.) by measuring the electrical characteristics in this manner, the workpiece may be a conductor as well as a magnetic material. Furthermore, the extraction of workpieces can be detected even if the workpieces are in close contact with each other in a state where the outer shapes align. Thus, workpiece extraction detection can be executed with few restrictions.

The hand 10 may further comprise a position deviation suppression pad 15 which suppresses position deviation of the workpiece when the workpiece is suctioned. The position deviation suppression pad 15 is preferably composed of a flexible material such as soft rubber or sponge and has a surface roughness or a high coefficient of friction by which workpieces do not move relative thereto. The surface 15a of the position deviation suppression pad 15 preferably protrudes from the suction surface 12c of the suction pad 12. This makes it possible to suppress lateral displacement of a workpiece with respect to the suction pad 12 without damaging the workpiece.

The tips of the electrodes 13 preferably protrudes at least from the suction surface 12c of the suction pad 12, or when the position deviation suppression pad 15 is provided, protrudes from the surface 15a of the position deviation suppression pad 15. As a result, the extraction of workpieces can be detected even with a Bernoulli-type hand which holds workpieces in a non-contact manner. Furthermore, in the case of a vacuum suction-type hand which suctions and holds workpieces, the tips of the electrodes 13 may be positioned along the suction surface 12c of the suction pad 12 or the surface 15a of the position deviation suppression pad 15.

In addition, it is preferable that the electrodes 13 be capable of ascending in response to contact with a workpiece. For example, it is preferable that electrode tubes 13a in which the electrodes 13 are stored be prepared, springs 13b be arranged in the electrode tubes 13a so that the electrodes 13 are biased by the springs 13b, the electrode tubes 13a be locked to the side wall, etc., of the suction pad 12 with locking members 13c, and the electrodes 13 project from the suction surface 12c of the suction pad 12 or the surface 15a of the position deviation suppression pad 15. As a result, the electrodes 13 retract (i.e., ascends) into the suction pad 12 while being biased by the springs 13b in response to contact with a workpiece, and the workpiece contacts both the electrodes 13 and the position deviation suppression pads 15. Since the electrodes 13 can ascend in accordance with the shape of the workpiece, even for workpieces having poor adhesion such as wrinkles or unevenness, workpiece extraction detection can be executed with few restrictions.

Figure 3A:
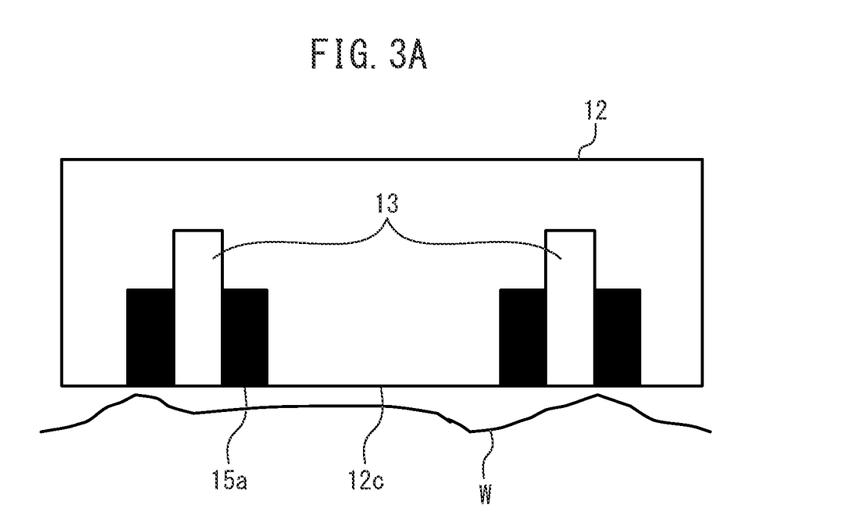
FIG. 3A is a partial cross-sectional view showing a cross-section of a suction pad comprising face-aligned electrodes.
Figure 3B:
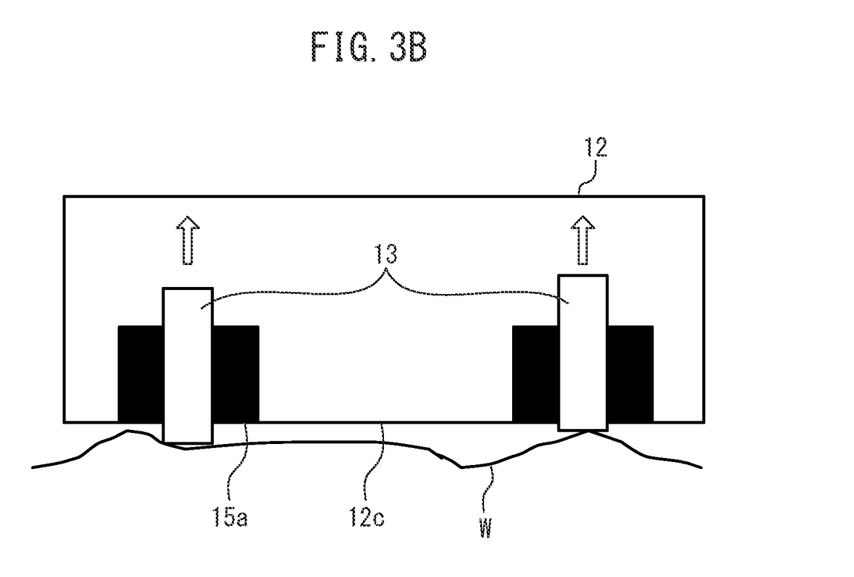
FIG. 3B is a partial cross-sectional view showing the cross-section of a suction pad comprising a protruding electrode which is capable of ascending.

FIG. 3A shows a partial cross section of the suction pad 12 having face-aligned electrodes 13, and FIG. 3B shows a partial cross section of the suction pad 12 having protruding electrodes 13 which are capable of ascending. As shown in FIG. 3A, for the electrodes 13 positioned along the suction surface 12c of the suction pad 12 or the surface 15a of the position deviation suppression pad, the electrodes 13 may not contact a wrinkled workpiece W. and in this case, the extraction of the workpiece W cannot be detected. Conversely, as shown in FIG. 3B, for the electrodes 13 which protrude from the suction surface 12c of the suction pad 12 or the surface 15a of the position deviation suppression pad and which can ascend in the direction of the arrow, even if the workpiece W has poor adhesion such as wrinkles or unevenness, the electrodes 13 can ascend in accordance with the shape of the workpiece, whereby the extraction of the workpiece W can be detected.

Figure 4:
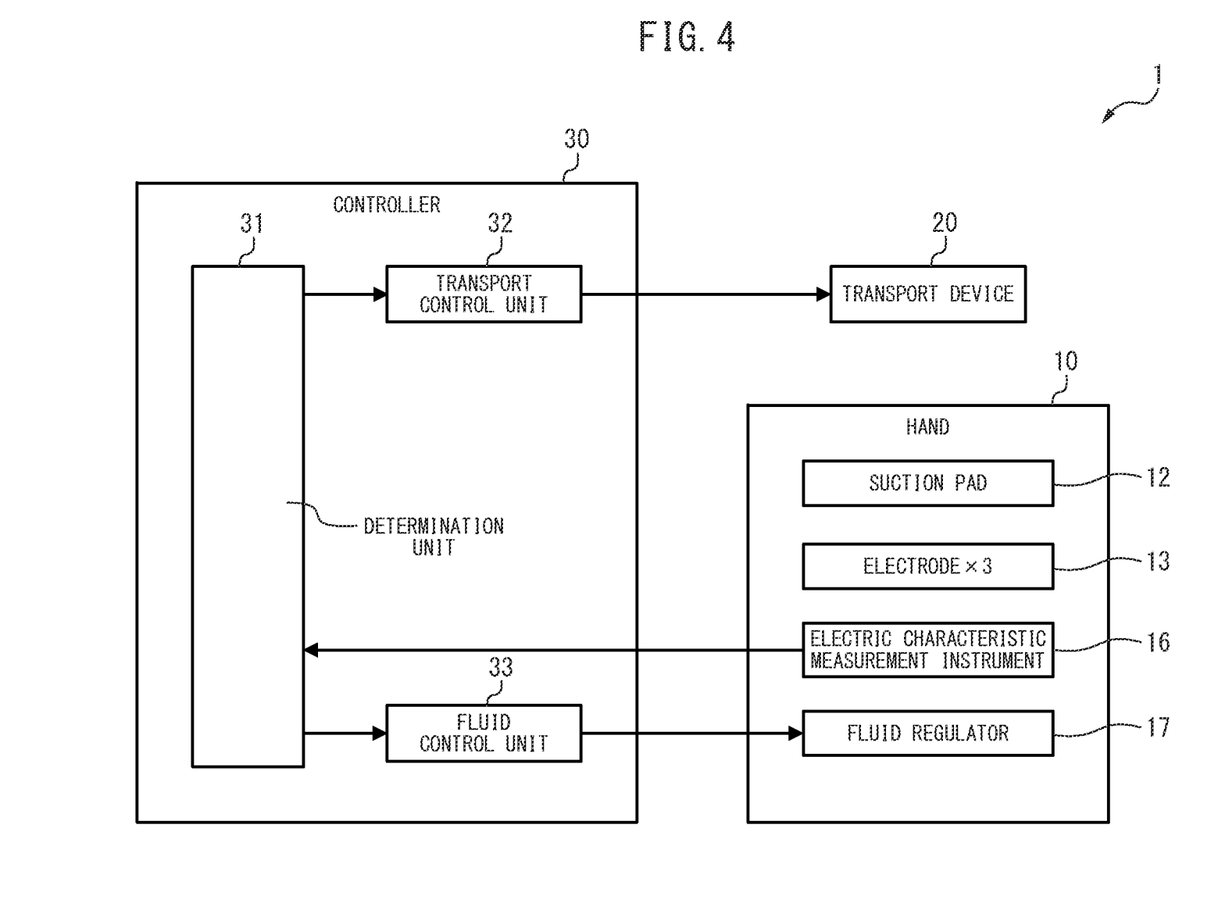
FIG. 4 is a block diagram showing an example of a control structure of a hand system.

FIG. 4 shows an example of the control configuration of the hand system 1. The hand system 1 further comprises a controller 30 which controls the hand 10 and the transport device 20. The controller 30 is a computer device comprising a processor such as a CPU (central processing unit), FPGA (field-programmable gate array), or ASIC (application specific integrated circuit), or is a semiconductor integrated circuit. The controller 30 comprises a determination unit 31 which determines the extraction and detection of workpieces (detection of the number of extracted pieces, detection of the gripping state, etc.) based on electrical characteristics, a fluid control unit 33 which controls a fluid regulator 17 based on the determination result of the determination unit 31, and a transport control unit 32 which controls the transport device 20 based on the determination result of the determination unit 31.

Figure 5:
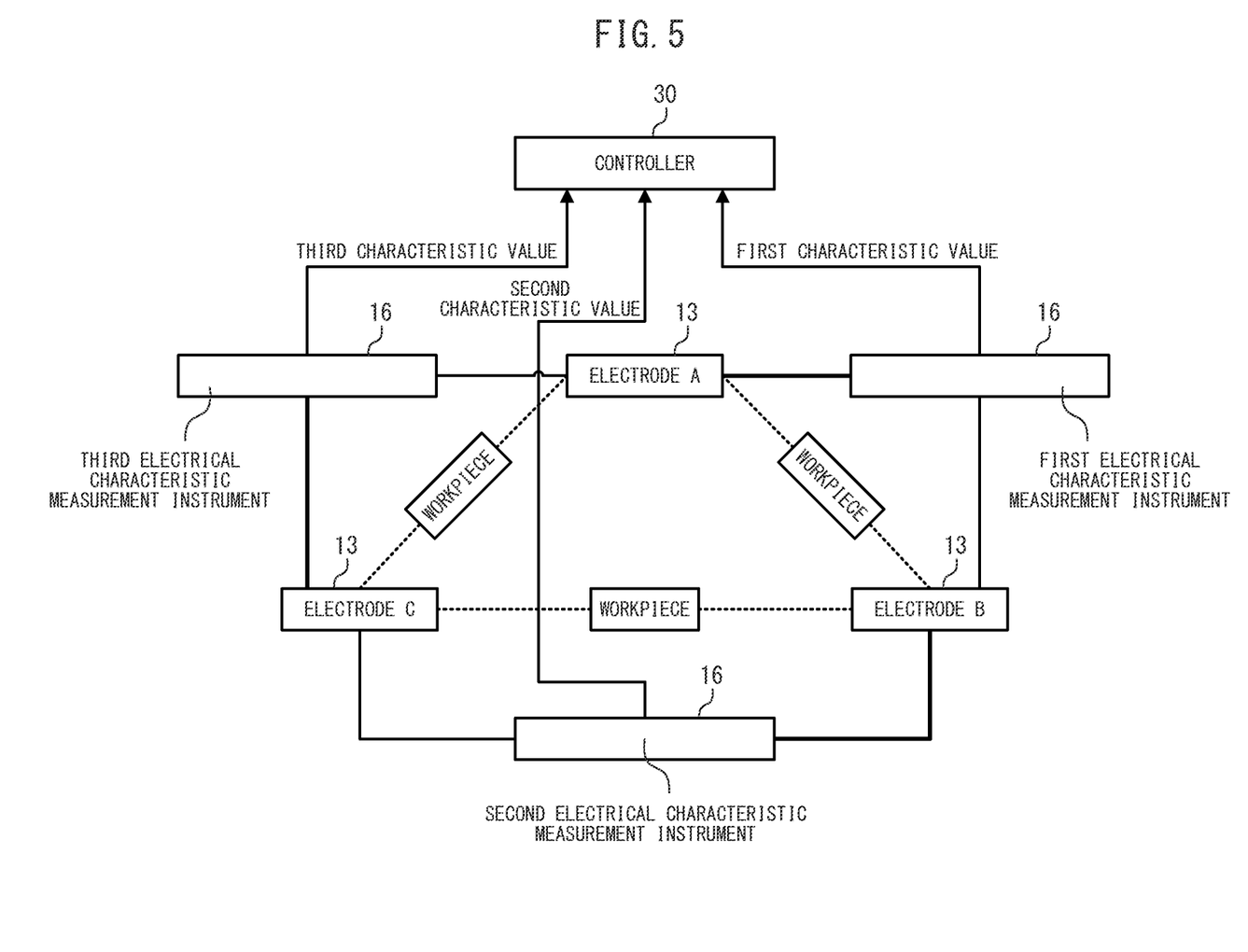
FIG. 5 is a block diagram showing an example of an electric circuit when there are three electrodes.

For example, it is preferable that the determination unit 31 determine the number of workpieces extracted by comparing the measured value of the electrical characteristics between any two electrodes 13 with a reference value, or determine the quality of the gripping state of a workpiece by a combination of the comparisons of the measured value of the electrical characteristics between any two electrodes 13 with the reference value. FIG. 5 shows an example of an electric circuit when there are three electrodes. In this example, the hand 10 comprises three electric characteristic measurement instruments, a first electric characteristic measurement instrument 16 measures an electrical characteristic value (first characteristic value) between electrodes A and B, a second electric characteristic measurement instrument 16 measures an electrical characteristic value (second characteristic value) between electrodes B and C, and a third electric characteristic measurement instrument 16 measures the electrical characteristic value (third characteristic value) between electrodes C and A. Note that in FIG. 5, the thick solid lines represent the electrical lines on the positive electrode side and the thin solid lines represent the electrical lines on the negative electrode side. The first to third characteristic values are read by the controller 30 (determination unit 31) and appropriately used. It is preferable that the determination unit 31 determine the number of workpieces extracted and the quality of the gripping state of the workpiece using the first to third characteristic values, for example, according to the logic determination formulas shown in the following table.

The transport control unit 32 preferably transmits a command for adjusting the transport speed of the workpiece to the transport device 20 in accordance with the quality of the gripping state of the workpiece detected by the determination unit 31. The transport device 20 adjusts the transport

TABLE 1

| Logic Determination Formula | Determination Result |
|---|---|
| Measured characteristic value between electrodes B-C < reference characteristic value between electrodes B-C ∪ measured characteristic value between electrodes C-A < reference characteristic value between electrodes C-A ∪ measured characteristic value between electrodes A-B < reference characteristic value between electrodes A-B<br>Ex)    second characteristic value between electrodes B-C = 0.5 Ω or less, reference characteristic value between electrodes B-C = 0.8 Ω<br>    second characteristic value between electrodes C-A = 0.5 Ω or less, reference characteristic value between electrodes C-A = 0.8 Ω<br>    second characteristic value between electrodes A-B = 0.5 Ω or less, reference characteristic value between electrodes A-B = 0.8 Ω | Multiple workpieces extracted |
| Measured characteristic value between electrodes B-C ≥ reference characteristic value between electrodes B-C ∩ measured characteristic value between electrodes C-A ≥ reference characteristic value between electrodes C-A ∩ measured characteristic value between electrodes A-B ≥ reference characteristic value between electrodes A-B<br>Ex)    measured characteristic value between electrodes B-C = 1.0 × $10^2$ Ω or more, reference characteristic value between electrodes B-C = 0.8 Ω<br>    measured characteristic value between electrodes C-A = 1.0 × $10^2$ Ω or more, reference characteristic value between electrodes C-A = 0.8 Ω<br>    measured characteristic value between electrodes A-B = 1.0 × $10^2$ Ω or more, reference characteristic value between electrodes A-B = 0.8 Ω | Zero workpieces extracted |
| Measured characteristic value between electrodes B-C ≥ reference characteristic value between electrodes B-C ∩ measured characteristic value between electrodes C-A ≥ reference characteristic value between electrodes C-A ∩ measured characteristic value between electrodes A-B ≈ reference characteristic value between electrodes A-B<br>Ex)    measured characteristic value between electrodes B-C = 1.0 × $10^2$ Ω or more, reference characteristic value between electrodes B-C = 0.8 Ω<br>    measured characteristic value between electrodes C-A = 1.0 × $10^2$ Ω or more, reference characteristic value between electrodes C-A = 0.8 Ω<br>    measured characteristic value between electrodes A-B = 0.7 to 0.9 Ω or more, reference characteristic value between electrodes A-B = 0.8 Ω | One workpiece extracted; gripping state unsuitable |
| Measured characteristic value between electrodes B-C ≈ reference characteristic value between electrodes B-C ∩ measured characteristic value between electrodes C-A ≈ reference characteristic value between electrodes C-A ∩ measured characteristic value between electrodes A-B ≈ reference characteristic value between electrodes A-B<br>Ex)    measured characteristic value between electrodes B-C = 0.7 to 0.9 Ω, reference characteristic value between electrodes B-C = 0.8 Ω<br>    measured characteristic value between electrodes C-A = 0.7 to 0.9 Ω, reference characteristic value between electrodes C-A = 0.8 Ω<br>    measured characteristic value between electrodes A-B = 0.7 to 0.9 Ω, reference characteristic value between electrodes A-B = 0.8 Ω | One workpiece extracted; gripping state suitable |

Referring again to FIG. 4, the fluid control unit 33 preferably transmits a fluid flow pressure or flow rate adjustment command to the fluid regulator 17 in accordance with the number of workpieces extracted detected by the determination unit 31. The fluid regulator 17 may be, for example, a solenoid valve capable of adjusting the flow pressure or flow rate of the fluid, and preferably is arranged on an air tube connected to the suction pad. The fluid regulator 17 adjusts the flow pressure or flow rate of the fluid based on the adjustment command of the fluid control unit 33. For example, it is preferable that the fluid regulator 17 reduce the flow pressure or flow rate of the fluid when the extraction of multiple workpieces is detected, and increase the flow pressure or flow rate of the fluid when the extraction of zero workpieces is detected. It is preferable that the fluid regulator 17 repeatedly adjust the flow pressure or flow rate until the number of workpieces becomes one.

speed of the workpiece based on the adjustment command of the transport control unit 32. For example, it is preferable that the transport device 20 reduce the transport speed of the workpiece when a defect in the gripping state of the workpiece is detected, and increase the transport speed of the workpiece when a suitable gripping state of the workpiece is detected.

Figure 6:
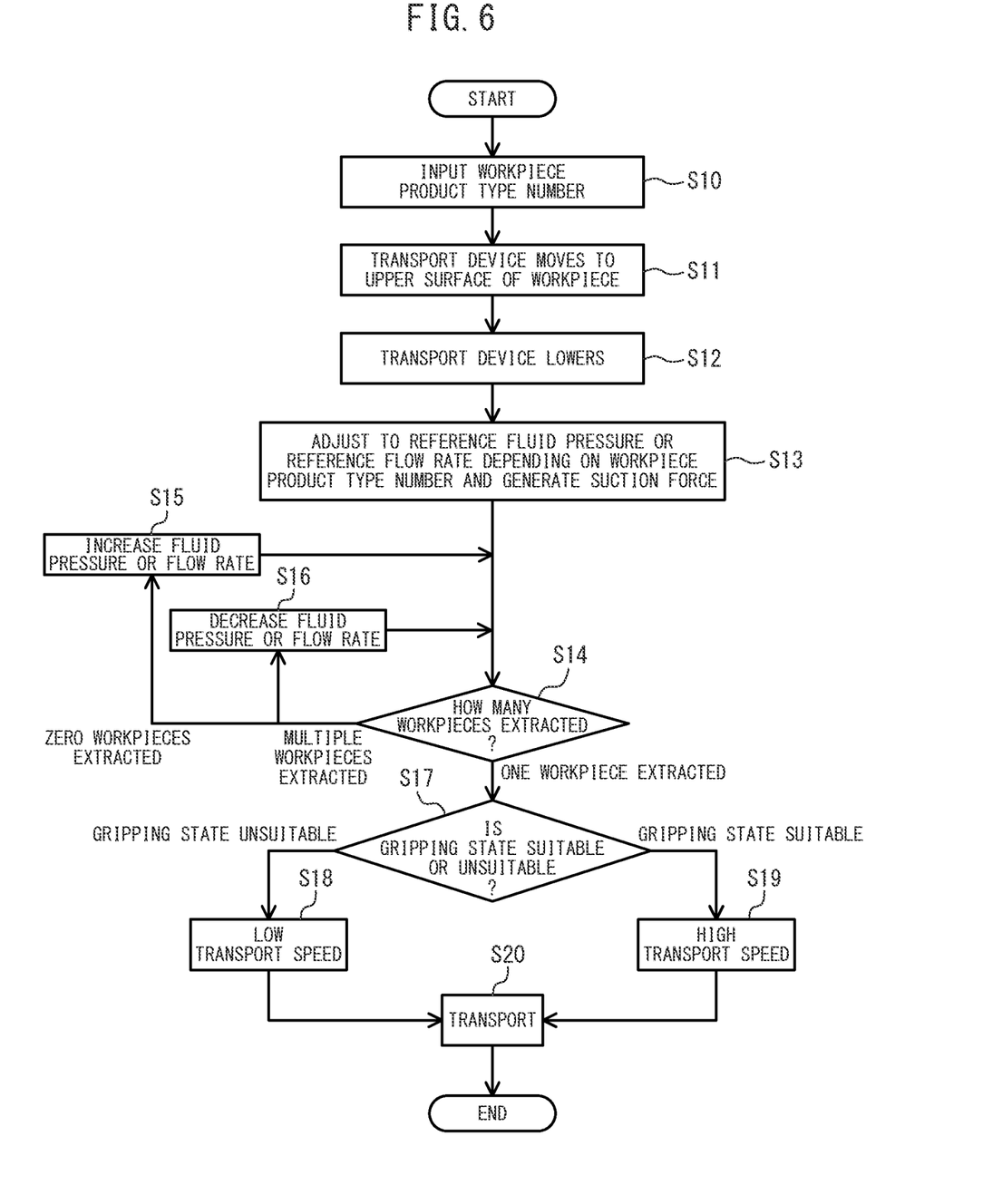
FIG. 6 is a flowchart showing an operation example of a hand system.

FIG. 6 shows an operation example of the hand system. First, as a preliminary preparation, (1) the reference characteristic value of an electric circuit formed by contact between any two electrodes 13 and one workpiece is measured and set in the controller 30 (determination unit 31), and (2) a reference flow pressure or reference flow rate necessary to suction one workpiece is measured and set in the controller 30 (determination unit 31).

In step S10, when the operator inputs a workpiece product type number into the controller 30, the controller 30 reads a preset reference characteristic value and reference flow pressure or reference flow rate. In step S11, the controller 30 moves the transport device 20 to the upper surface of the workpiece. In step S12, the controller 30 lowers the transport device 20 and moves it to the workpiece extraction position. In step S13, the controller 30 adjusts the fluid regulator 17 to the reference flow pressure or the reference flow rate in accordance with the workpiece product type number to generate a suction force.

In step S14, the controller 30 determines the number of workpieces extracted based on the electrical characteristics between any two of the electrodes 13. When it is detected in step S14 that zero workpieces have been extracted, the fluid regulator 17 increases the flow pressure or flow rate of the fluid to increase the suction force of the workpiece in step S15. When it is detected that a plurality of workpieces have been extracted in step S14, the fluid regulator 17 reduces the flow pressure or flow rate of the fluid to reduce the suction force of the workpiece in step S16. Then, returning to step S14, the controller 30 again determines the number of workpieces extracted based on the electrical characteristics between any two of the electrodes 13. The processes of steps S14 to S16 are repeated until one workpiece is extracted.

When the extraction of one workpiece is detected in step S14, the process proceeds to step S17, and the controller 30 determines whether the gripping state of the workpiece is suitable or unsuitable based on the combination of electrical characteristics between any two of the electrodes 13. When a defect in the gripping state is detected in step S17, the process proceeds to step S18, and the transport speed of the workpiece is reduced so that the workpiece is not shaken off of the transport device 20 during transport. When a suitable gipping state is detected in step S17, the process proceeds to step S19, and the transport device 20 increases the transport speed of the workpiece so that the workpiece is transported at high speed during transport. In step S20, the transport device 20 then transports the workpiece to the predetermined location. Note that the determination of the number of workpieces extracted in step S14 and the determination of the quality of the gripping state in step S17 may be performed simultaneously.

Figure 7:
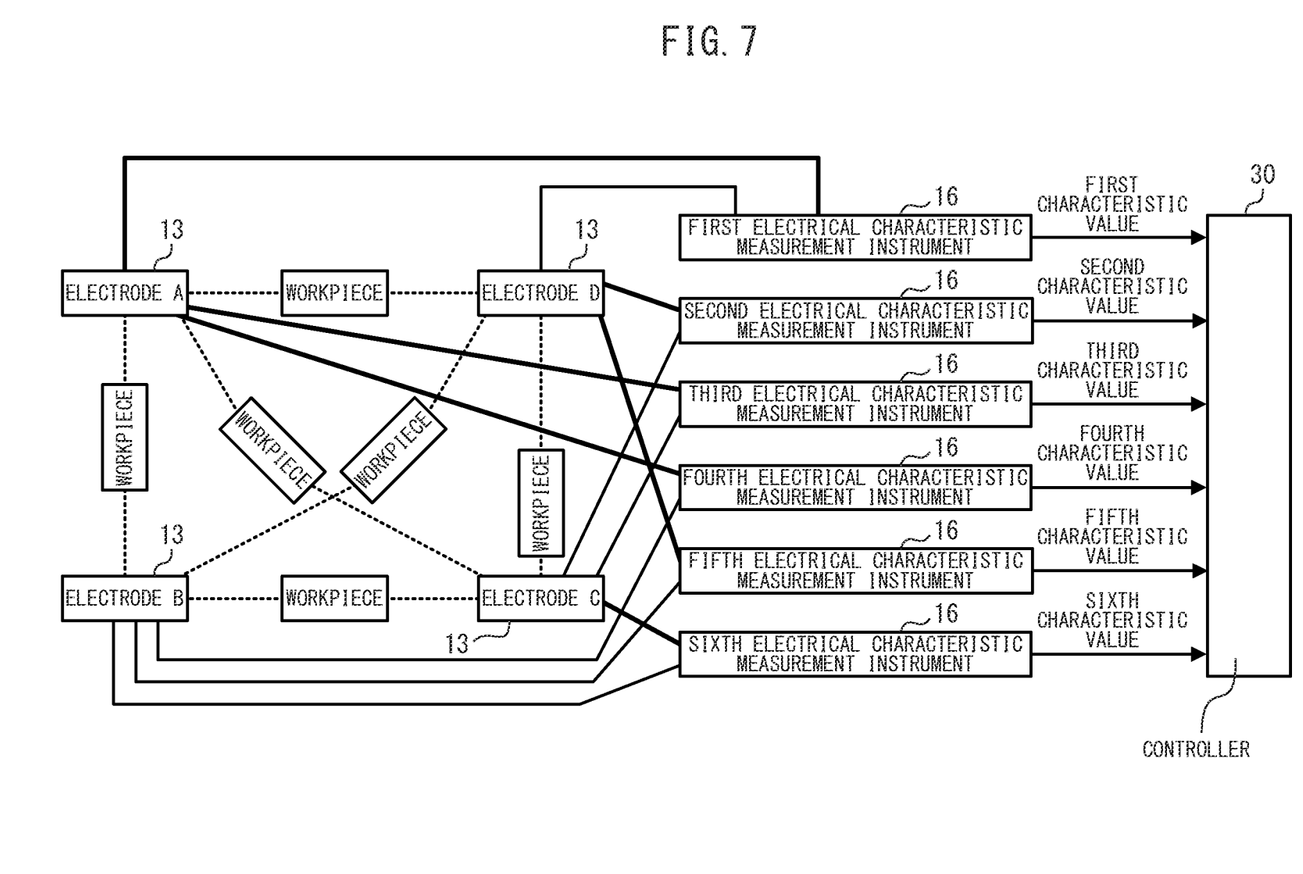
FIG. 7 is a block diagram showing an example of an electric circuit when there are four electrodes.

FIG. 7 shows an example of an electric circuit when there are four electrodes. In this example, the hand 10 comprises four electric characteristic measurement instruments. A first electric characteristic measurement instrument 16 measures a first characteristic value between electrodes A and D, a second electric characteristic measurement instrument 16 measures a second characteristic value between electrodes D and C, a third electric characteristic measurement instrument 16 measures a third characteristic value between electrodes A and C, a fourth electric characteristic measurement instrument 16 measures a fourth characteristic value between electrodes A and B, a fifth electric characteristic measurement instrument 16 measures a fifth characteristic value between electrodes D and B. and a sixth electric characteristic measurement instrument 16 measures a sixth characteristic value between electrodes C and B. Note that in FIG. 7, the thick solid lines represent the electrical lines on the positive electrode side, and the thin solid lines represent the electrical lines on the negative electrode side. The first to sixth characteristic values are read by the controller 30 (determination unit 31) and appropriately used. In such an electric circuit configuration, as the number of electrodes increases, the number of electric characteristic measurement instruments becomes significant. Thus, it is desirable that the hand 10 have a configuration (for example, a rotary contact described later) in which contact can be instantaneously switched to any two electrodes and the electrical characteristic values can be measured by one electrical characteristics value measuring device.

Figure 8:
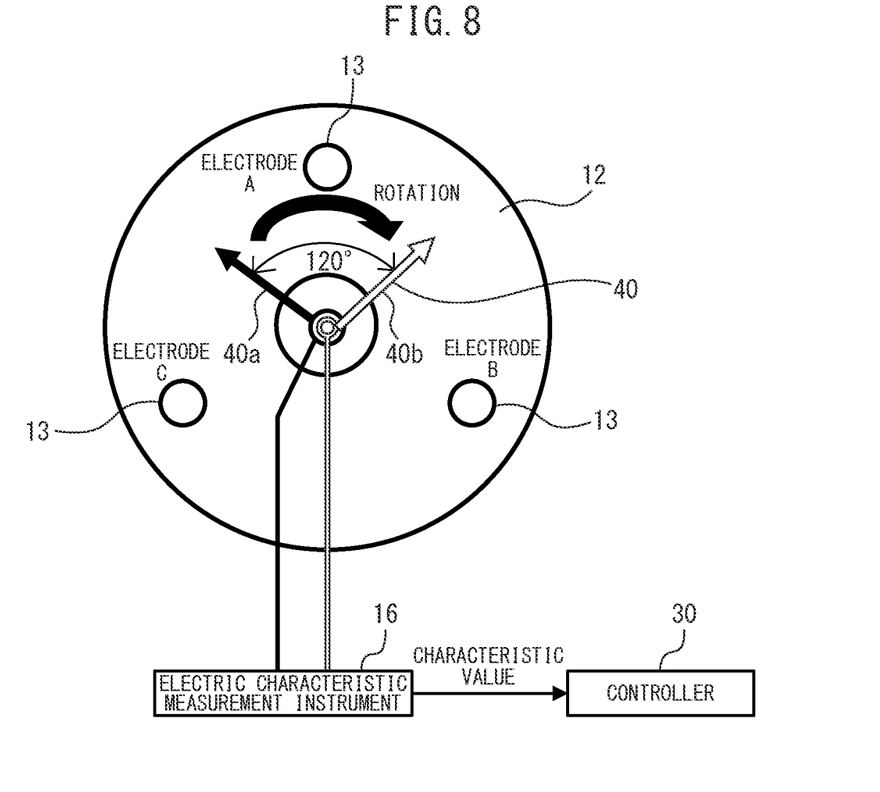
FIG. 8 is a plan view showing an example of the structure of a rotary contact when there are three electrodes.

FIG. 8 shows a configuration example of a rotary contact 40 when there are three electrodes 13. The rotary contact 40 comprises a plurality of terminals 40a, 40b having predetermined central angles depending on the arrangement of the electrodes 13. For example, when the three electrodes 13 are arranged at equal intervals in the circumferential direction of the suction pad 12, it is preferable that the rotary contact 40 have two terminals 40a, 40b having a central angle of 120°. Note that in FIG. 8, the black arrow represents the terminal 40a on the positive electrode side, and the gray arrow represents the terminal 40b on the negative electrode side. The rotary contact 40 is configured such that the rotation angle is controlled by a drive source (not illustrated) such as a motor, and the contact is instantaneously switched to any two of the electrodes 13. It is preferable that the drive source be controlled by the controller 30.

Figure 9:
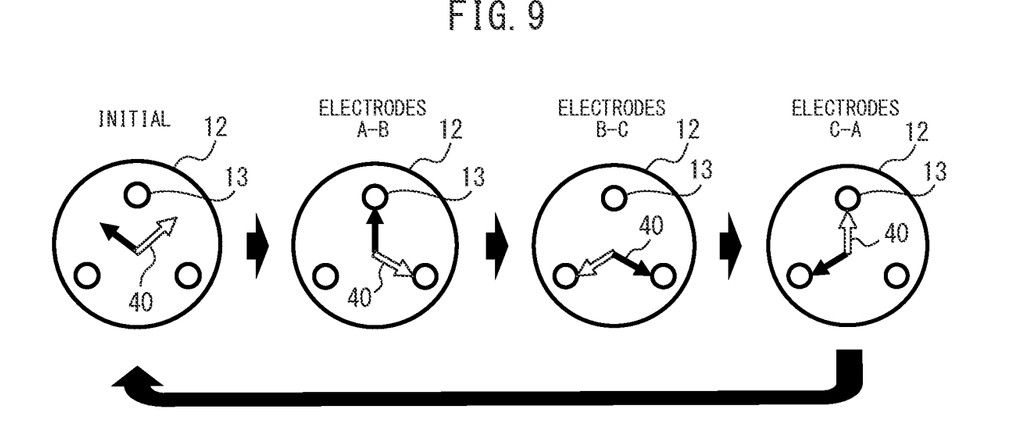
FIG. 9 is a plan view showing an example of the operation of the rotary contact when there are three electrodes.

FIG. 9 shows an operation example of the rotary contact 40 when there are three electrodes 13. For example, in the initial state, the rotary contact 40 is positioned at a rotation angle that does not contact any of the electrodes 13. When the suction pad 12 suctions a workpiece, the contact of the rotary contact 40 is switched to between electrodes A and B and the electrical characteristic value (first characteristic value) is measured, next the contact of the rotary contact 40 is switched between electrodes B and C and the electrical characteristic value (second characteristic value) is measured, and subsequently, the contact of the rotary contact 40 is switched between electrodes C and A and the electrical characteristic value (third characteristic value) is measured. Since the rotary contact 40 can switch contact to any two of the electrodes 13 in this manner, even if the number of electrodes 13 increases, three characteristic values (first to third characteristic values) can be measured with only one electric characteristic measurement instrument 16. As a result, workpiece extraction detection can be executed with few restrictions.

Figure 10:
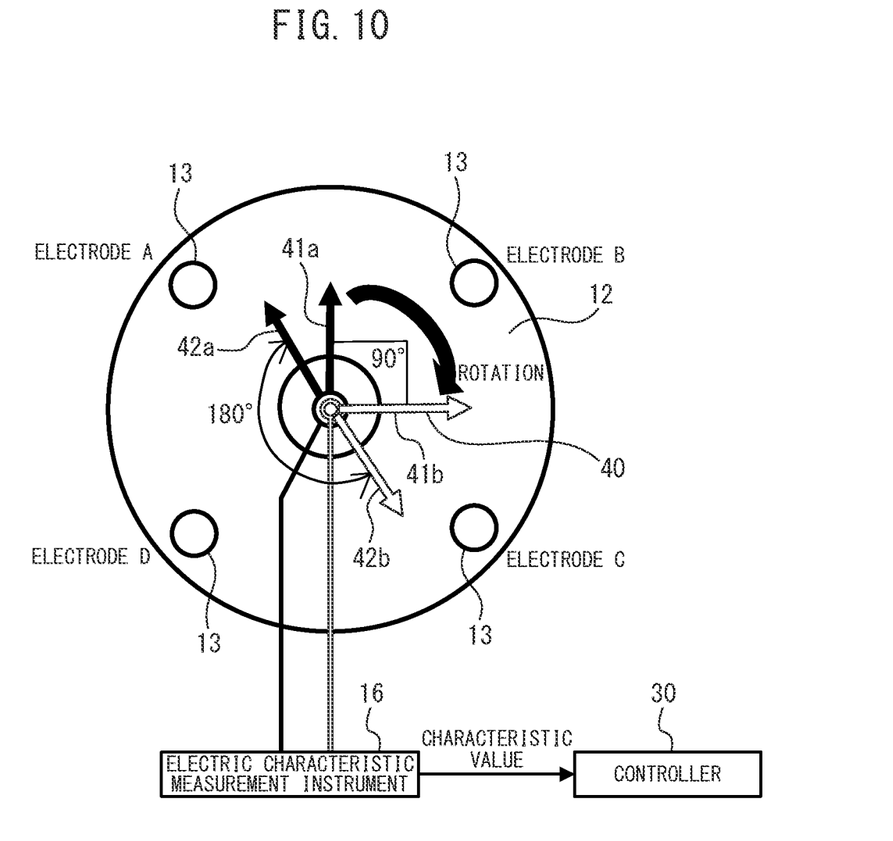
FIG. 10 is a plan view showing an example of the structure of a rotary contact when there are four electrodes.

FIG. 10 shows a configuration example of the rotary contact 40 when there are four electrodes 13. For example, when the four electrodes 13 are arranged at equal intervals in the circumferential direction of the suction pad 12, it is preferable that the rotary contact 40 comprise two terminals 41a, 41b having a central angle of 90° and two terminals 42a, 42b having a central angle of 180°. Note that in FIG. 10, the black arrows represent the terminals 41a, 41b on the positive electrode side, and the gray arrows represent the terminals 42a, 42b on the negative electrode side. The rotation angle of the rotary contact 40 is controlled by a drive source (not illustrated) such as a motor, and the contact is instantaneously switched to any two of the electrodes 13. It is preferable that the drive source may be controlled by the controller 30.

Figure 11:
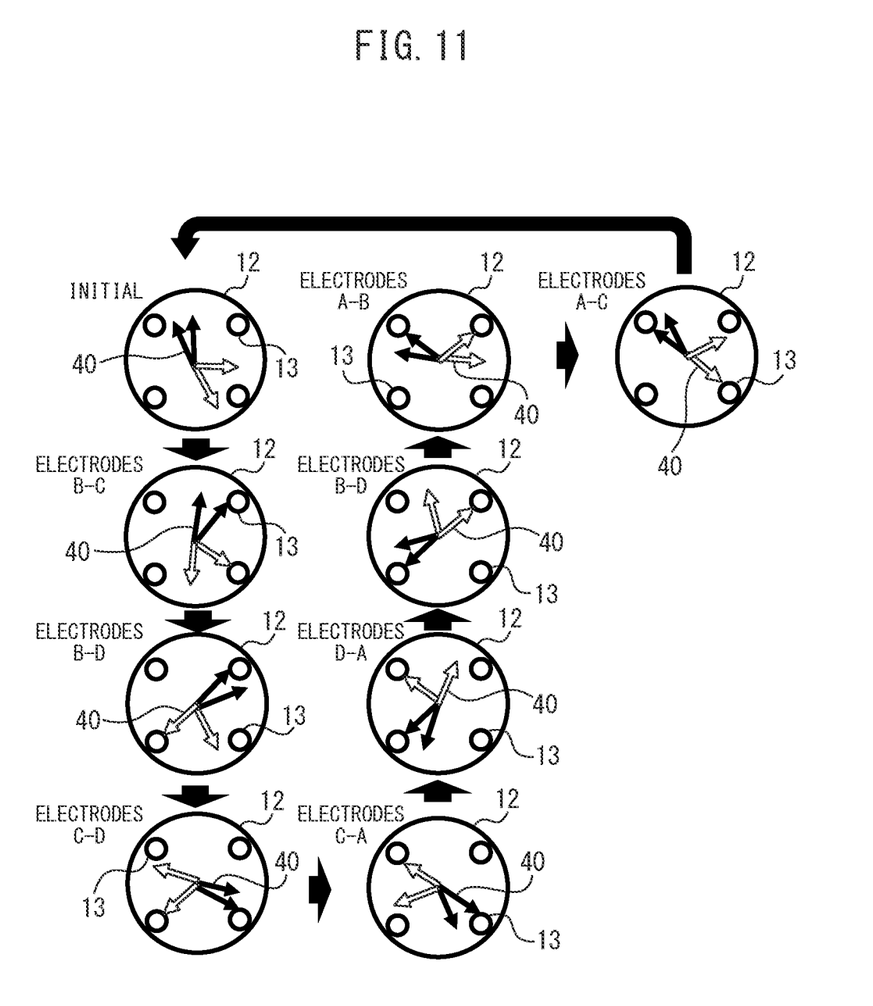
FIG. 11 is a plan view showing an example of the operation of the rotary contact when there are four electrodes.

FIG. 11 shows an operation example of the rotary contact 40 when there are four electrodes 13. For example, in the initial state, the rotary contact 40 is positioned at a rotation angle that does not contact any of the electrodes 13. When the suction pad 12 suctions a workpiece, the contact of rotary contact 40 is switched between electrodes B and C and the electrical characteristic value (sixth characteristic value) is measured, the contact of the rotary contact 40 is next switched between electrodes B and D and the electrical characteristic value (fifth characteristic value) is measured, the contact of the rotary contact 40 is switched between electrodes C and D and the electrical characteristic value (second characteristic value) is measured, the contact of the rotary contact 40 is switched between electrodes C and A and the electrical characteristic value (third characteristic value) is measured, the contact of the rotary contact 40 is then switched between electrodes D and A and the electrical characteristic value (first characteristic value) is measured, the contact of the rotary contact 40 is next switched between electrodes B and D and the electrical characteristic value (fifth characteristic value) is measured, the contact of the rotary contact 40 is further switched between electrodes A and B and the electrical characteristic value (fourth characteristic value) is measured, and next, the contact of the rotary contact 40 is switched between electrodes A and C and the electrical characteristic value (third characteristic value) is measured. Note that in this operation example, the fifth characteristic value and the third characteristic value are measured in an overlapping manner, but it is preferable to control the rotation angle of the rotary contact 40 so as not to overlap. Since the rotary contact 40 can switch contact to any two of the electrodes 13 in this manner, even if the number of electrodes 13 increases, six characteristic values (first to sixth characteristic values) can be measured with only one electric characteristic measurement instrument 16. As a result, workpiece extraction detection can be executed with few restrictions.

According to the embodiments described above, by providing the hand 10 with at least three electrodes 13, the gripping state of the workpiece can be detected. Furthermore, the number of workpieces extracted can be detected by measuring the electrical characteristics of an electric circuit formed by contact between any two of the electrodes 13 and the workpiece. Since the extraction of workpieces is detected by measuring the electrical characteristics, the workpiece is not limited to magnetic materials and it is sufficient that it be a conductive material. Furthermore, the extraction of workpieces can be detected even if the workpieces are in close contact with each other in a state where the outer shapes thereof are aligned. Thus, workpiece extraction detection (detection of the number of extractions, detection of the gripping state, etc.) can be executed with few restrictions.

Furthermore, since the electrode 13 protrudes from the suction pad 12, the extraction of workpieces can be detected even with a Bernoulli-type hand which holds workpieces in a non-contact manner. Further, even if the workpiece has poor adhesion such as wrinkles or unevenness, the electrodes 13 can ascend in accordance with the shape of the workpiece, whereby workpiece extraction detection can be executed with few restrictions.

Further, since the rotary contact 40 can switch contact to any two of the electrodes 13, even if the number of electrodes 13 increases, the electrical characteristic values between any of the electrodes can be measured with only one electric characteristic measurement instrument 16. As a result, workpiece extraction detection can be executed with few restrictions.

The program executed by the processor described above and the program for executing the flowchart described above may be recorded and provided on a computer-readable non-transitory recording medium such as a CD-ROM, or be may wired or wirelessly distributed and provided from a server device on a WAN (wide area network) or LAN (local area network).

Though various embodiments have been described herein, it should be noted that the invention is not limited to the embodiments described above and various modifications can be made within the scope of the claims.

DESCRIPTION OF REFERENCE SIGNS 1 hand system
10 hand
11 palm
12 suction pad
12a nozzle
12b nozzle hole
12c suction surface
13 electrode
13a electrode tube
13b spring
13c locking member
14 electrical line
15 position deviation suppression pad
15a surface
16 electric characteristic measurement instrument
17 fluid regulator
20 transport device
30 controller
31 determination unit
32 transport control unit
40 rotary contact
40a, 40b terminal
41a, 41b terminal
42a, 42b terminal
50 mounting device
W workpiece

The invention claimed is:

1. A hand system, comprising:
    a suction pad configured to suction a conductive workpiece by the fluid effect,
    at least three electrodes arranged on the suction pad;
    an electric characteristic measurement instrument configured to measure electrical characteristics of an electric circuit formed by contact between any two of the electrodes and the workpiece; and
    a determination unit configured to determine a number of the workpieces extracted based on the electrical characteristics.

2. The hand system according to claim 1, further comprising a fluid regulator configured to regulate a flow pressure or flow rate of a fluid depending on the number of the workpieces extracted.

3. The hand system according to claim 2, wherein the fluid regulator repeats adjustment of the flow pressure or flow rate until a single workpiece is extracted.

4. The hand system according to claim 1, further comprising a transport device configured to regulate a transport speed of the workpiece depending on the quality of the gripping state of the workpiece.

5. A hand system, comprising:
    a suction pad configured to suction a conductive workpiece by the fluid effect,
    at least three electrodes arranged on the suction pad;
    an electric characteristic measurement instrument configured to measure electrical characteristics of an electric circuit formed by contact between any two of the electrodes and the workpiece; and
    a determination unit configured to determine quality of a gripping state of the workpiece based on a combination of the electrical characteristics.

6. A hand system, comprising:

a suction pad configured to suction a conductive workpiece by the fluid effect, at least three electrodes arranged on the suction pad;

an electric characteristic measurement instrument configured to measure electrical characteristics of an electric circuit formed by contact between any two of the electrodes and the workpiece; and a determination unit configured to simultaneously determines the number of the workpieces extracted and quality of a gripping state of the workpiece based on the electrical characteristics.

7. A hand, comprising:

a suction pad configured to suction a conductive workpiece by the fluid effect, at least three electrodes arranged on the suction pad; and a rotary contact which is capable of switching contact with any two of the electrodes, wherein the at least three electrodes are arranged at equal intervals along a peripheral direction of the suction pad, and the rotary contact comprises a plurality of terminals having predetermined central angles in accordance with arrangement of the electrodes.

* * * * *